United States Patent [19]

Teramachi

[11] Patent Number: 4,576,421
[45] Date of Patent: Mar. 18, 1986

[54] LINEAR SLIDE BEARING

[76] Inventor: Hiroshi Teramachi, 2-34-8, Higashi-Tamagawa, Setagaya-ku, Tokyo, Japan

[21] Appl. No.: 639,368

[22] Filed: Aug. 9, 1984

[30] Foreign Application Priority Data

Aug. 12, 1983 [JP] Japan ................................. 58-146530

[51] Int. Cl.⁴ ............................................. F16C 29/06
[52] U.S. Cl. .................................................... 308/6 C
[58] Field of Search ............. 308/3 R, 3 A, 6 R, 6 C, 308/6 B

[56] References Cited

U.S. PATENT DOCUMENTS

| 3,436,132 | 4/1969 | Wiesler | 308/6 C |
| 4,025,995 | 5/1977 | Thomson | 308/6 C X |
| 4,253,709 | 3/1981 | Teramachi | 308/6 C |
| 4,390,215 | 6/1983 | Mottate | 308/6 C |

Primary Examiner—Stuart S. Levy
Assistant Examiner—David Werner
Attorney, Agent, or Firm—Peter L. Berger

[57] ABSTRACT

A linear slide bearing effects a reciprocative motion along a track rail while bearing downward and horizontal loads by one of the skirts of a bearing case and upward and horizontal loads by the other skirt. The linear slide bearing has a race-receiving groove which is formed in the inner surface of one of the skirts of the bearing case, the race-receiving groove opening diagonally downward, and a race-receiving groove which is formed in the inner surface of the other skirt, the race-receiving groove opening diagonally upward. These race-receiving grooves are respectively fitted with bearing races each having a loaded ball groove which is located such as to face the corresponding one of ball-rolling grooves formed on the track rail.

3 Claims, 17 Drawing Figures

LINEAR SLIDE BEARING

BACKGROUND OF THE INVENTION

The present invention relates to a linear slide bearing which is widely employed in the sliding part of various general industrial machines such as X-, Y- and Z-axes of numerically controlled machine tools, automatic tool changers, automatic welding machines, injection molding machines and industrial robots, for example, a movable table for guiding a linear reciprocative motion.

The inventor of the present invention has previously proposed linear slide bearings of this type in Japanese Patent Application Nos. 49,170/1982 and 162,113/1982, which have not yet been laid open. These linear slide bearings are of so-called cantilever type wherein a pair of bearings are usually incorporated in a movable table, for example, and are adapted to guide a linear reciprocative motion along a track rail while bearing downward and horizontal loads by one of the skirts of the bearing case of each bearing which has a substantially C-shaped cross-section and upward and horizontal loads by the other skirt.

The previously proposed linear slide bearings have the following advantages: Since it is only necessary to provide a minimum number of loaded ball grooves on the bearing case and ball-rolling grooves on the track rail, which loaded ball grooves are required to have high accuracy in order to allow balls bearing a load to roll smoothly therethrough and consequently need a large number of steps in groove-grinding operation, it is possible to manufacture the bearings at a correspondingly low cost. Moreover, the bearings are easily incorporated in, for example, movable tables. In addition, the bearings are easily preloaded.

The above-described linear slide bearings, however, still inconveniently require the groove-grinding operation when forming two loaded ball grooves on the bearing case. Moreover, these loaded ball grooves are not easily machined, since they are located on the respective inner surfaces of both skirts of the bearing case. In addition, there is a need for an inconveniently large amount of labor in order to finish the loaded ball groove with high accuracy, particularly in the case where the loaded ball grooves need to be subjected to a so-called crowning operation wherein the groove width at both end portions of each loaded ball groove is made slightly larger than that at the central portion thereof, thereby to allow the balls to smoothly roll and recirculate from a non-loaded region to a loaded region and vice versa. In addition, it is necessary to form the whole of the bearing case from a material which is high in rigidity in order to cope with the requisite high rigidity for the portions of the bearing cases where the loaded ball grooves are to be formed. In consequence, although it is possible to minimize the number of the loaded ball grooves on the bearing case and the ball-rolling grooves on the track rail, the above-described linear slide bearings still suffer the problem of high production cost.

SUMMARY OF THE INVENTION

In view of the above, it is a primary object of the present invention to improve the cantilever-type linear slide bearings, which have previously been proposed by the present inventor, thereby to overcome the above-described disadvantages thereof.

To this end, according to the present invention, a race-receiving groove which opens diagonally downward is formed in the inner surface of one of the skirts of the bearing case, while a race-receiving groove which opens diagonally upward is formed in the inner surface of the other skirt, and these race-receiving grooves are respectively fitted with bearing races each having a loaded ball groove which is located such as to face the corresponding ball rolling groove on the track rail.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
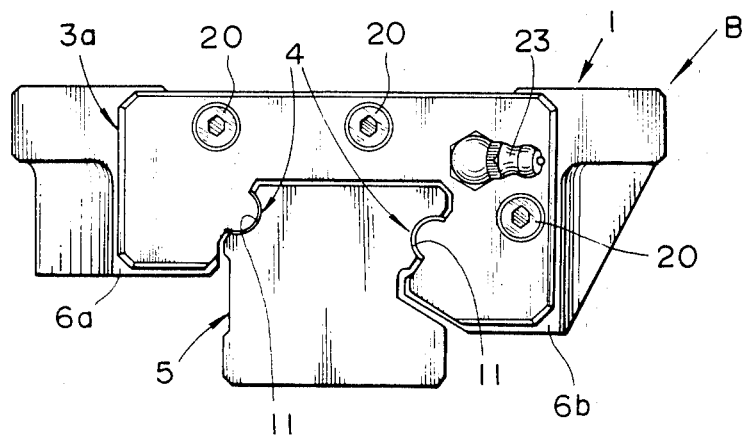
FIG. 1 is a front elevational view of a linear slide bearing in accordance with one embodiment of the present invention.

The present invention will be described hereinunder in detail through one embodiment with reference to the accompanying drawings.

FIGS. 1 to 5 in combination show a linear slide bearing B in accordance with one embodiment of the invention. The bearing B comprises: a bearing case 1; a pair of bearing races 2a, 2b; a pair of end plates 3a, 3b; a multiplicity of balls 4; and a track rail 5. The bearing case 1 is formed such as to have a substantially C-shaped cross-section with skirts 6a, 6b which are asymmetric with each other with respect to the longitudinal axis of the bearing B. One skirt 6a is provided in the inner surface thereof with a race-receiving groove 7a of substantially semicircular cross-section which opens diagonally downward at 45° with respect to the horizontal plane of the bearing B, while the other skirt 6b is provided in the inner surface thereof with a race-receiving groove 7b of substantially semicircular cross-section which opens diagonally upward at 45° with respect to the horizontal plane of the bearing B. The bearing case 1 further has ball-recirculating bores 8 which longitudinally extend therethrough in parallel to the corresponding race-receiving grooves 7a, 7b. The bearing races 2a, 2b are formed into a substantially semicylindrical shape and are respectively fitted in the race-receiving grooves 7a, 7b formed in the bearing case 1. One bearing race 2a has a loaded ball groove 9 of substantially semicircular cross-section which opens diagonally downward at 45° with respect to the horizontal plane of the bearing B, while the bearing race 2b has a loaded ball groove 9 of substantially semicircular cross-section which opens diagonally upward at 45° with respect to the horizontal plane of the bearing B. The end plates 3a, 3b are attached to both end surfaces, in the longitudinal direction, of the bearing case 1. Each of the end plates 3a, 3b is provided in the inner surface thereof with a guide groove 10 which provides communication between one of the ends of each loaded ball groove 9 and that of the corresponding ball-recirculating bore 8 thereby to constitute one of the endless tracks. The balls 4 are adapted to recirculate through the endless tracks. Further, the track rail 5 has its upper portion received in the recess formed on the lower side of the bearing case 1 with a predetermined clearance therebetween. The track rail 5 has ball-rolling grooves 11 of substantially semicircular cross-section which are formed in the longitudinal direction of the track rail 5 such as to face the corresponding loaded ball grooves 9. The track rail 5 is adapted to bear through the balls 4 the load which is applied to the bearing case 1.

The bearing case 1 has, as shown in FIGS. 1 to 8, overhangs 12a, 12b respectively extending along the outsides of both the skirts 6a, 6b. Each of the overhangs 12a, 12b is provided at the longitudinal end portions thereof with recesses 13 formed in their lower surfaces and with mounting bores 14 vertically extending therethrough. Further, the bearing case 1 is provided in the longitudinal end surfaces thereof with holes 15 for receiving screws which are employed to mount the end plates 3 to their respective end surfaces. In addition, at each of the longitudinal ends of each ball-recirculating bore 8 formed in the bearing case 1 is formed a round portion 16 extending toward the center of the corresponding loaded ball groove 9, thereby allowing the balls 4 to roll smoothly between each ball-recirculating bore 8 and the corresponding guide groove 10 on the end plate 3.

Thus, the bearing case 1 is not directly provided with the loaded ball grooves 9 through which the balls 4 roll and therefore is not required to have a particularly high rigidity, which fact makes it possible to select a low-cost material for the bearing case 1. In addition, the construction of the bearing case 1 is advantageous when the bearing case 1 is formed from a lightweight material, such as an aluminum molded product, an aluminum extrusion-molded product or a hard synthetic resin molded product in order to reduce the time required for the movement of the bearing case 1 to reach a predetermined speed at the time of starting thereof and to decrease the inertia at the time of suspension of the movement of the bearing case 1 whereby the bearing B which is required to repeat a linear reciprocative motion at high speed is constructed.

The bearing races 2a, 2b, which are respectively fitted in the race-receiving grooves 7a, 7b formed in the inner surfaces of both the skirts 6a, 6b of the bearing case 1, are formed from a material with a high rigidity such as to have the same configuration as each other. At each of the ends of each of the loaded ball grooves 9 respectively formed in the bearing races 2a, 2b is formed a round portion 17 extending toward the center of the corresponding ball-recirculating bore 8, thereby allowing the balls 4 to roll smoothly between each loaded ball groove 9 and the corresponding guide groove 10 formed in the end plate 3.

Figure 11:
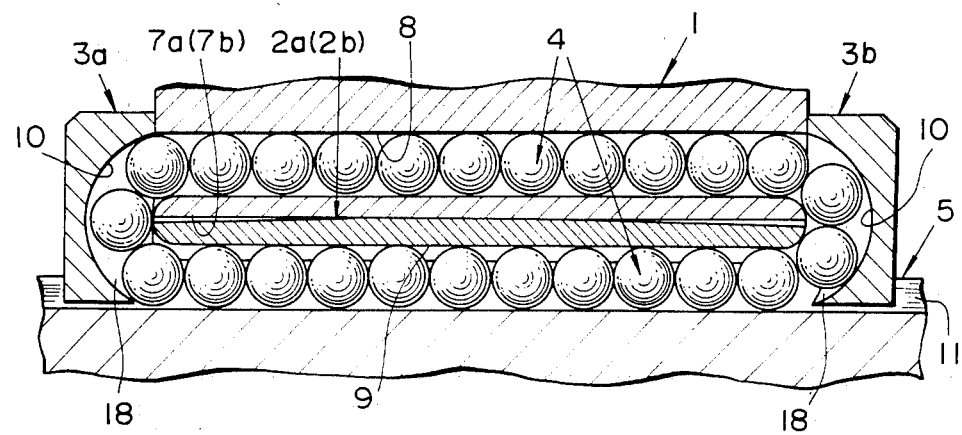
FIGS. 11 and 12 are sectional views, respectively similar to FIGS. 5 and 10, showing a modification of the bearing race.
Figure 12:
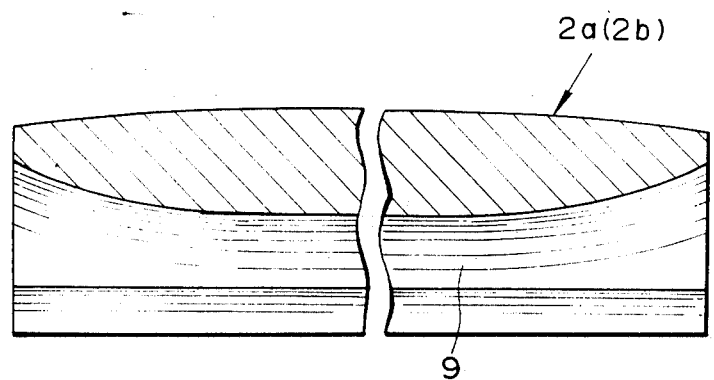

It is to be noted that each of the bearing races 2a, 2b is, as shown to an enlarged scale in FIGS. 11 and 12, formed into a so-called semi-barrel shape such that the central portion of the bearing race is slightly larger in diameter than both the end portions thereof in order to allow the bearing races 2a, 2b to slightly roll and pitch in their respective race-receiving grooves 7a, 7b in the bearing case 1. Thus, when the bearing case 1 effects a linear reciprocative motion along the track rail 5, the bearing case 1 smoothly passes any slight vertical waviness or twist of the track rail 5 and effects alignment, thereby allowing a smooth linear reciprocative motion to be attained.

Figure 13:
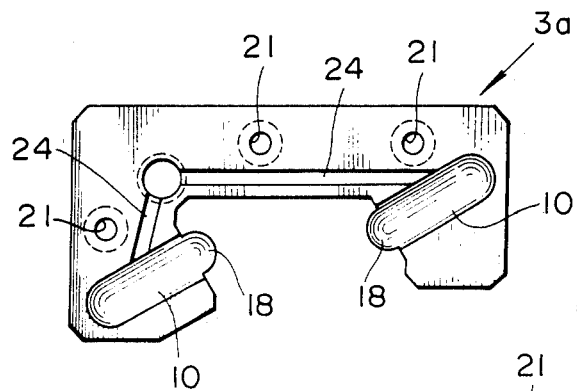
FIG. 13 is a rear view of one of the end plates of the linear slide bearing in accordance with the invention.
Figure 14:
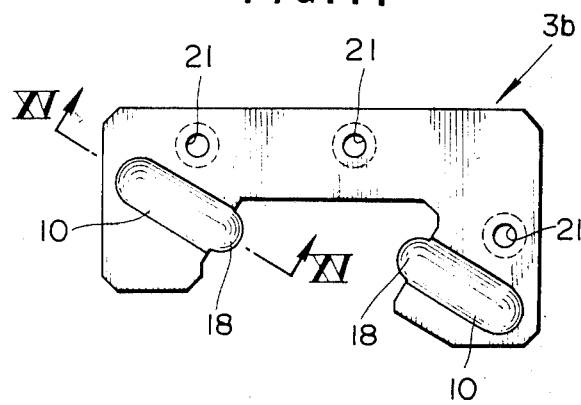
FIG. 14 is a rear view of the other end plate.
Figure 15:
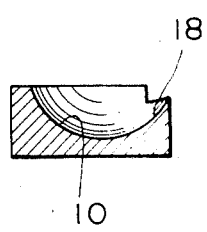
FIG. 15 is a sectional view taken along the line XV—XV of FIG. 14.

Moreover, as shown in FIGS. 13 to 15, each of the end plates 3a, 3b has a guide projection 18 formed at the end portion of each guide groove 10 on the side thereof which is closer to the corresponding loaded ball groove 9. The guide projection 18 serves to guide the balls 4 into the guide groove 10 when they roll out of the passage defined between the loaded ball groove 9 and the corresponding ball-rolling groove 11 on the track rail 5 while bearing a load or to guide the balls 4 from the guide groove 10 into the passage defined between the loaded ball groove 9 and the ball-rolling groove 11. It is to be noted that the reference numeral 21 in the Figures denotes each of the mounting bores for receiving respective mounting bolts 20 when the end plates 3a, 3b are attached to the bearing case 1. Each of the mounting bolts 20 is attached through a positioning bush 22 as shown in FIG. 2. Moreover, one end plate 3a is provided, as shown in FIGS. 1 and 13, with a grease nipple 23 and an oil groove 24 for guiding a grease forced in from the grease nipple 23 into the endless tracks for the balls 4.

Figure 2:
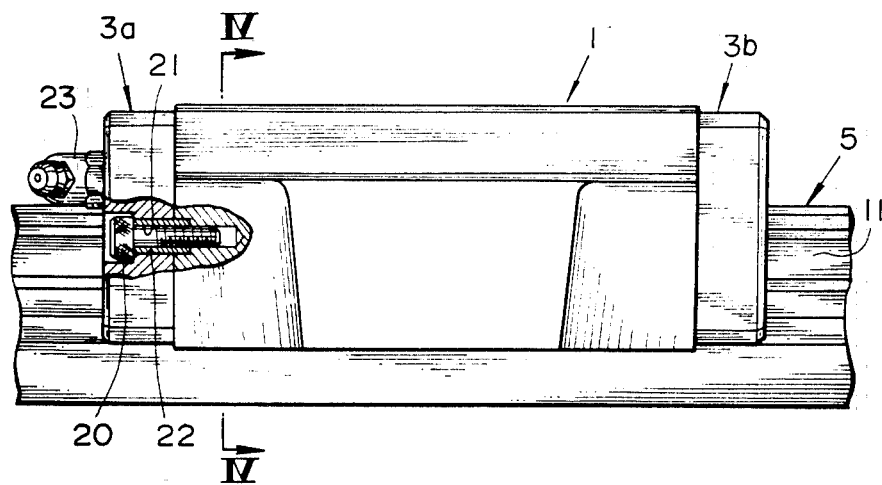
FIG. 2 is a partly-sectioned side elevational view of the linear slide bearing shown in FIG. 1.
Figure 3:
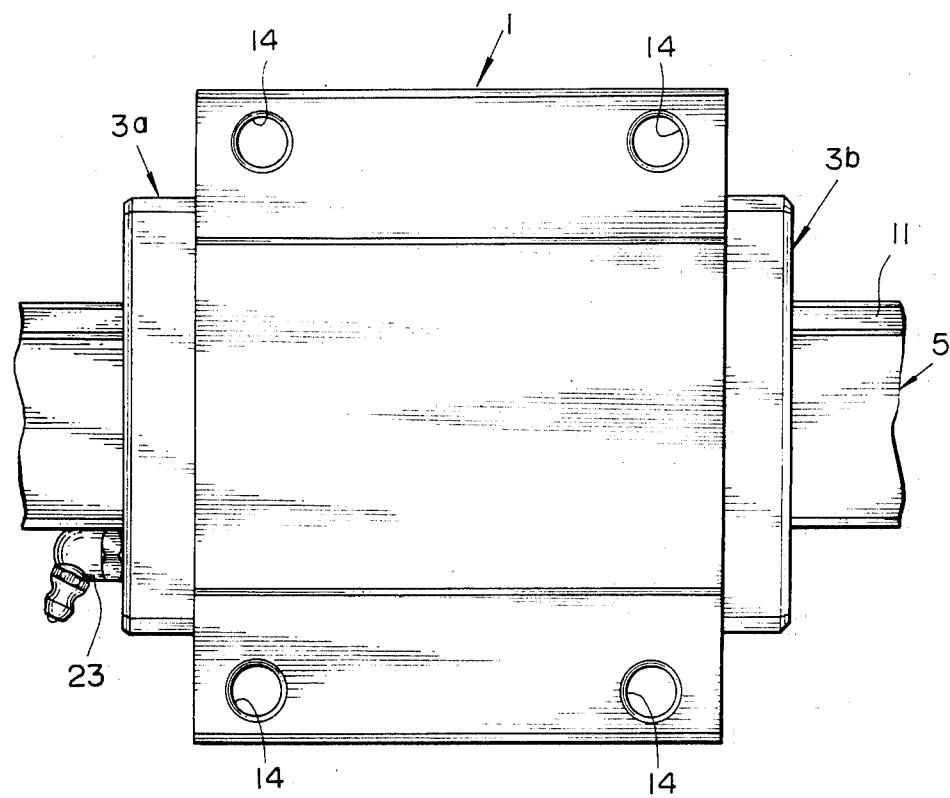
FIG. 3 is a plan view of the linear slide bearing shown in FIG. 1.
Figure 4:
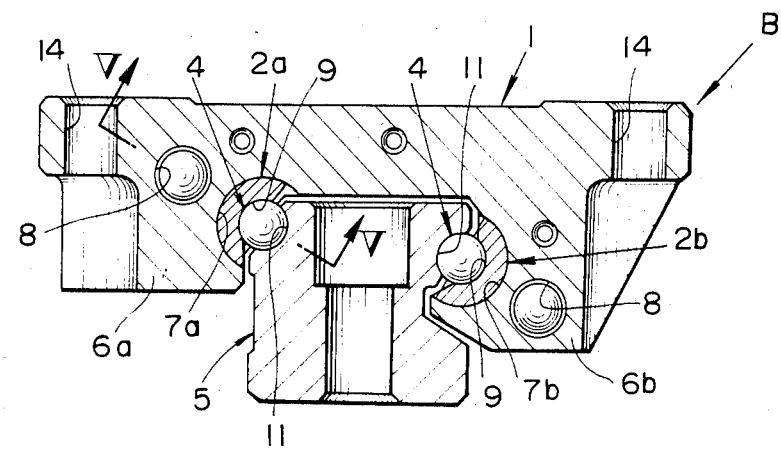
FIG. 4 is a sectional view taken along the line IV—IV of FIG. 2.
Figure 5:
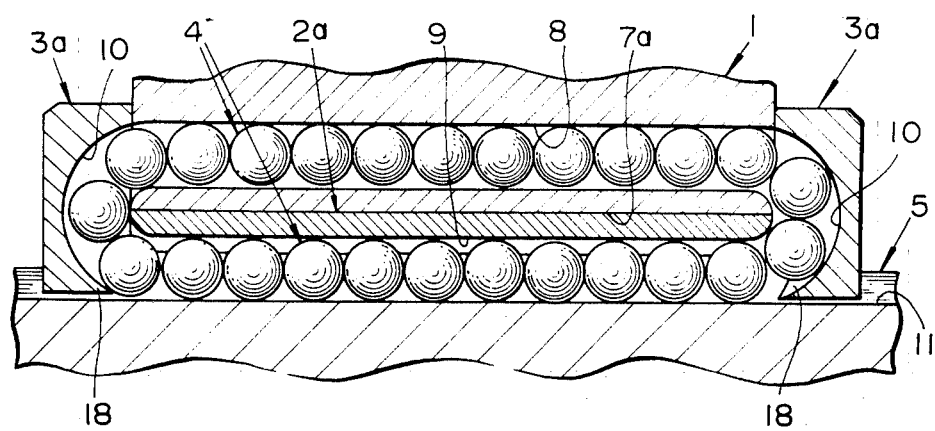
FIG. 5 is a sectional view taken along the line V—V of FIG. 4.
Figure 6:
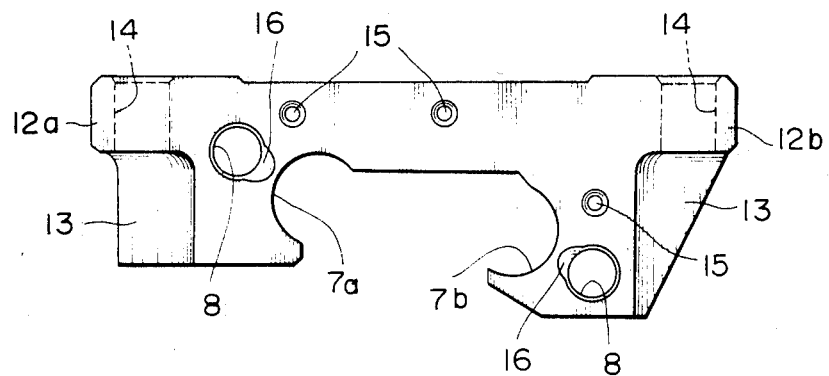
FIG. 6 is a front elevational view of the bearing case of the linear slide bearing in accordance with the invention.
Figure 7:
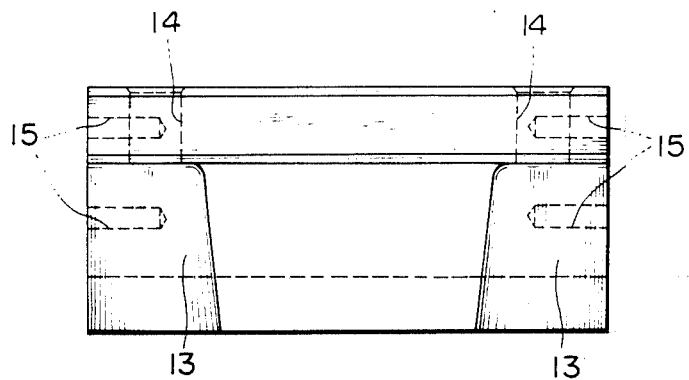
FIG. 7 is a side elevational view of the bearing case shown in FIG. 6.
Figure 8:
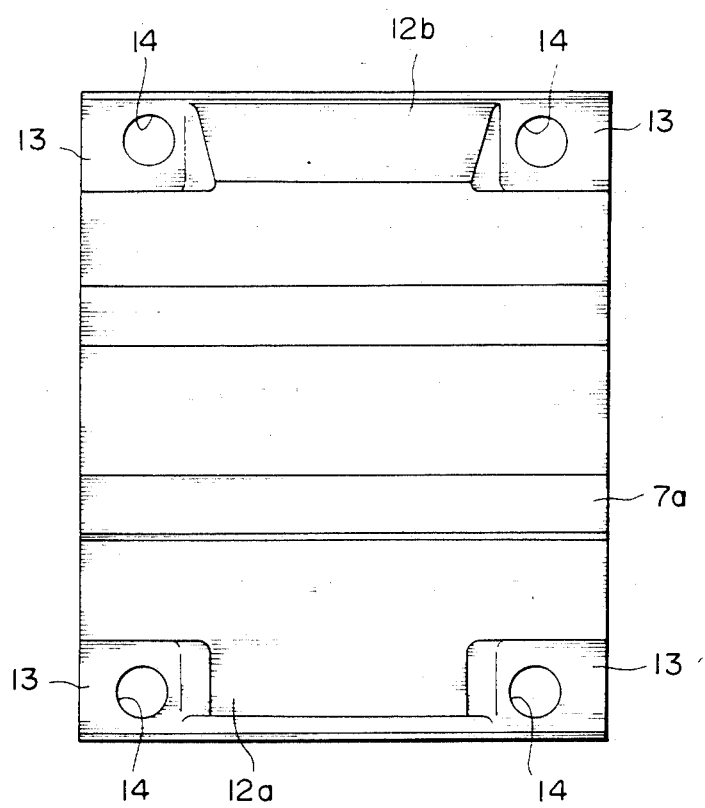
FIG. 8 is a bottom view of the bearing case shown in FIG. 6.
Figure 9:
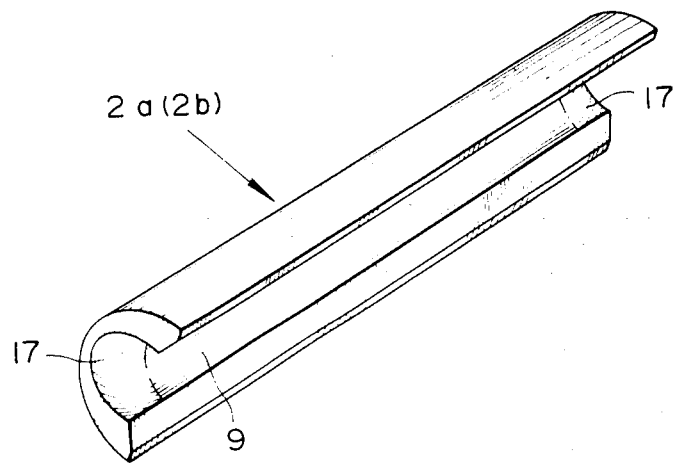
FIG. 9 is a perspective view of the bearing race of the linear slide bearing in accordance with the invention.
Figure 10:
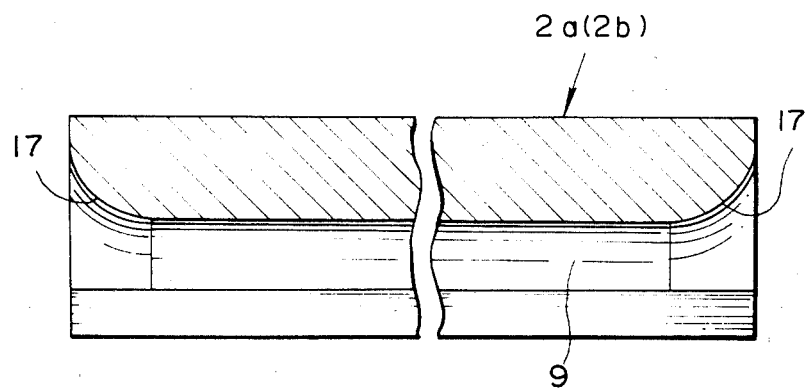
FIG. 10 is an enlarged partial vertical sectional view of the bearing race shown in FIG. 9.
Figure 16:
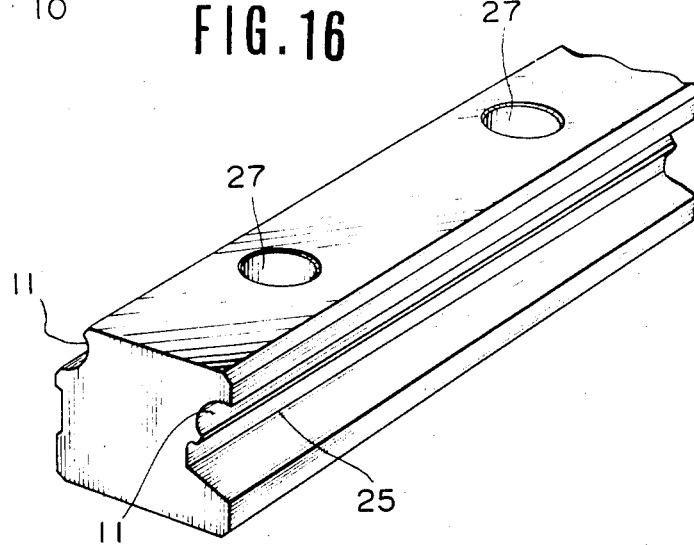
FIG. 16 is a perspective view of the track rail of the linear slide bearing in accordance with the invention.

As shown in FIGS. 1, 4 and 16, the track rail 5 is constituted by a square bar of substantially square cross-section having high rigidity. The track rail 5 is provided on one of the shoulders thereof with one ball-rolling groove 11 which longitudinally extends and opens diagonally upward at 45° with respect to the horizontal plane of the track rail 5. In addition, the track rail 5 is provided in the other side surface thereof with a recess 25 of substantially triangular cross-section extending in the longitudinal direction of the track rail 5. In the wall surface of the recess 25 is formed the other ball-rolling groove 11 which opens diagonally downward at 45° with respect to the horizontal plane of the track rail 5. Moreover, mounting bores 27 for receiving fixing bolts (denoted by the reference numeral 26 in FIG. 17) which are employed to secure the track rail 5 are bored in the track rail 5 with a predetermined spacing therebetween.

Figure 17:
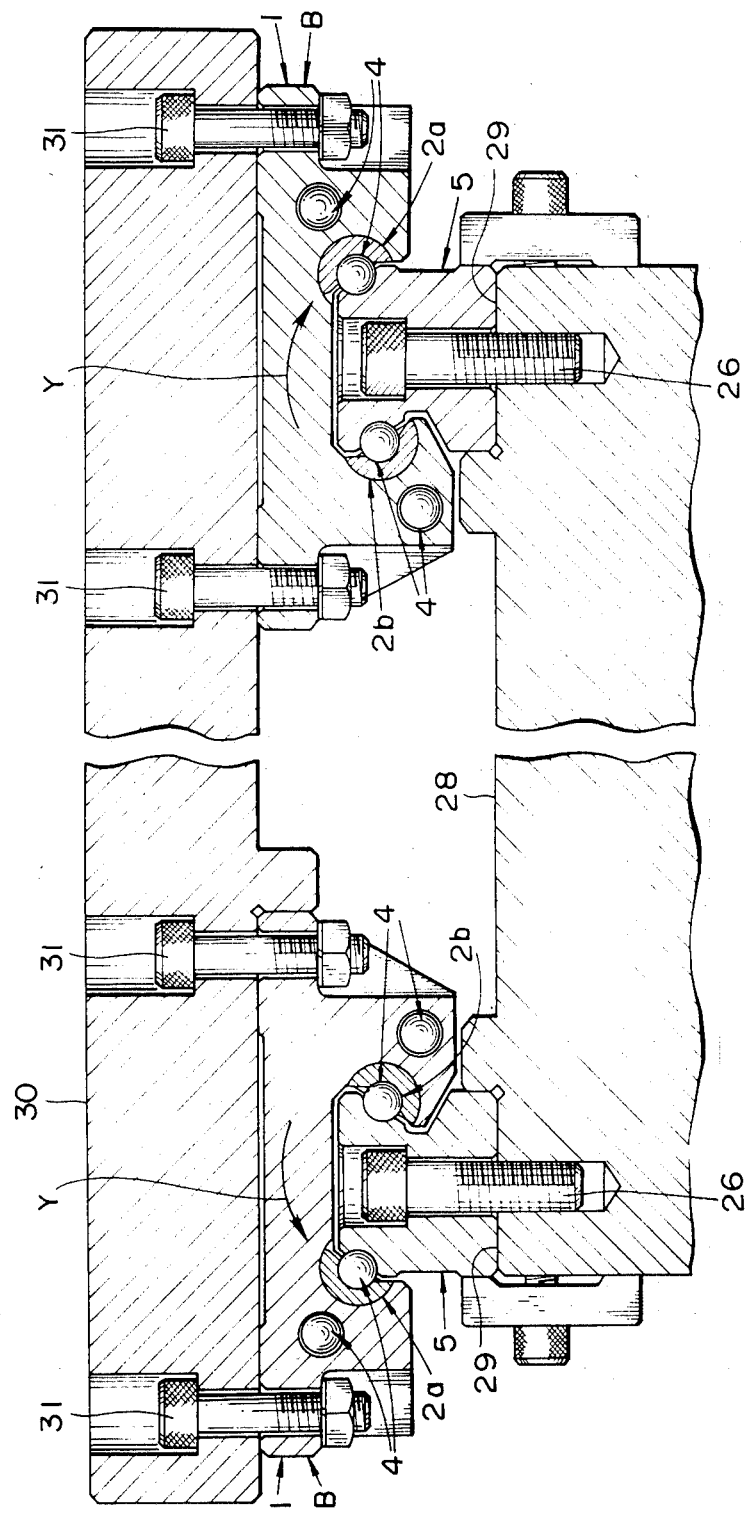
FIG. 17 is a sectional view of a linear slide table constructed by incorporating the bearing shown in FIG. 1.

The linear slide bearing B in accordance with the above-described embodiment is used by being incorporated in a linear slide table which guides a linear reciprocative motion of various kinds of machine or device. For example, as shown in FIG. 17, two track rails 5 are respectively secured, by means of the fixing bolts 26, to mounting reference surfaces 29 of a bed 28 which is mounted on a machine or apparatus, and then a mounting table 30 is placed on the bearing cases 1 which slide along their respective track rails 5 and is then secured by means of connecting bolts 31. In this case, in order to apply a predetermined preload to each bearing B, a shim (not shown) with a predetermined thickness is interposed between each bearing case 1 and the mounting table 30 thereby to twist each bearing case 1 in the direction of the corresponding arrow Y. In such case, when each bearing case 1 is tilted, the bearing races 2a, 2b thereof follow the tilting motion of the bearing case 1 to effect alignment between the ball-rolling grooves on the track rail 5 and the corresponding loaded ball grooves 9 formed in the bearing races 2a, 2b through the balls 4, thereby allowing a smooth linear reciprocative motion of each bearing case 1 to be ensured.

As has been described above, in the linear slide bearing of the present invention, the bearing case is provided in one of the opposing inner surfaces thereof with the race-receiving groove which opens diagonally downward, while the other inner surface is formed with the race-receiving groove which opens diagonally upward, and these race-receiving grooves are respectively fitted with the bearing races each having the loaded ball groove. Therefore, the loaded ball grooves, which are respectively located on the inner surface sides of both the skirts of the bearing case and therefore have not conventionally been easily machined, can be easily subjected to grinding, quenching and other treatment, since the loaded ball grooves are formed in the bearing races before they are fitted in their respective race-receiving grooves. Accordingly, it is possible to improve the machining accuracy and to attain reliable quenching and other necessary treatment without impairing the various advantages of the so-called cantilever-type linear slide bearings. In addition, the production cost can be reduced.

Moreover, in the linear slide bearing of this type, it is general practice, for the purposes of improving the load bearing capacity and life of the bearing and increasing the rigidity of the bearing, to apply a preload to the bearing in order to make the clearance negative between the balls on one hand and each loaded ball groove on the bearing case and the corresponding ball-rolling groove on the track rail on the other thereby to increase the area of contact of all the balls which bear a load between the grooves. In order to ensure the smooth recirculation of the balls from the non-loaded region to the loaded region and vice versa in the case where the bearing is preloaded, it is, according to the invention, possible to easily subject the loaded ball grooves to a so-called crowning operation.

Furthermore, since the loaded ball groove portion which is required to have a high rigidity is constituted by the bearing race as an element which is provided separately from the bearing case, it is possible to manufacture the bearing case itself from a material which is low in cost or form the bearing case from a lightweight material thereby to cope with the need for increasing the speed of the linear reciprocative motion of the bearing case.

What is claimed is:
1. A linear slide bearing comprising:
a bearing body having
two skirts which straddle a rail track along which said bearing body is adapted to reciprocate, one of said skirts transferring downward and horizontal loads to said track rail and the other of said skirts transferring upward and horizontal loads to said track rail;
a first race receiving groove formed in an inner surface of one of said skirts, said first race receiving groove having a substantially semicircular configuration in cross-section and opening obliquely in a downwardly facing direction;
a second race receiving groove formed in an inner surface of the other of said skirts, said second race receiving groove having a substantially semicircular configuration in cross-section and opening obliquely in an upwardly facing direction;
said two race receiving grooves permitting twisting of said bearing body with respect to said track rail to allow preloading to said linear slide bearing;
two bearing races, each fitted in a respective race receiving groove, each bearing race having a substantially semicylindrical configuration in cross-section with an outer configuration thereof conforming to the substantially semicircular configuration of the respective race receiving groove in which it is fit, each bearing race having an inner surface with a loaded ball groove positioned so as to face a corresponding ball rolling groove formed on said track rail, and the center of the outside diameter of each bearing race being substantially coincident with the center of a ball which bears a load between said loaded ball groove on the related bearing race and the corresponding ball rolling groove on said track rail.

2. A linear slide bearing according to claim 1, wherein each of said bearing races is formed into such a shape that an approximately central portion thereof is slightly larger in diameter than both end portions thereof in order to allow said bearing races to slightly roll and pitch in their race-receiving grooves, thereby to effect alignment in the linear reciprocative motion of said bearing case.

3. A linear slide bearing comprising:
a bearing body having
two skirts which straddle a rail track along which said bearing body is adapted to reciprocate, one of said skirts transferring downward and horizontal loads to said track rail and the other of said skirts transferring upward and horizontal loads to said track rail;
only two race receiving grooves formed in said skirts;
a first one of said race receiving grooves formed in an inner surface of one of said skirts, said first race receiving groove having a substantially semicircular configuration in cross-section and opening obliquely in a downward facing direction;
the second one of said race receiving grooves formed in an inner surface of the other of said skirts, said second race receiving groove having a substantially semicircular configuration in cross-section and opening obliquely in an upwardly facing direction;

said two race receiving grooves permitting twisting of said bearing body with respect to said track rail to allow preloading to said linear slide bearing;

two bearing races, each fitted in a respective race receiving groove, each bearing race having a substantially semicylindrical configuration in cross-section with an outer configuration thereof conforming to the substantially semicircular configuration of the respective race receiving groove in which it is fit, each bearing race having an inner surface with a loaded ball groove positioned so as to face a corresponding ball rolling groove formed on said track rail, and the center of the outside diameter of each bearing race being substantially coincident with the center of a ball which bears a load between said loaded ball groove on the related bearing race and the corresponding ball rolling groove on said track rail.

* * * * *